United States Patent
Wang et al.

(10) Patent No.: US 11,256,575 B2
(45) Date of Patent: Feb. 22, 2022

(54) METHODS, ELECTRONIC DEVICES AND COMPUTER PROGRAM PRODUCTS FOR MANAGING AND PERFORMING DATA BACKUP JOBS

(71) Applicant: EMC IP Holding Company LLC, Hopkinton, MA (US)

(72) Inventors: Yi Wang, Chengdu (CN); Qin Liu, Chengdu (CN); Qingxiao Zheng, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 550 days.

(21) Appl. No.: 16/146,798

(22) Filed: Sep. 28, 2018

(65) Prior Publication Data
US 2019/0384677 A1 Dec. 19, 2019

(30) Foreign Application Priority Data
Jun. 15, 2018 (CN) .......................... 201810623229.9

(51) Int. Cl.
*G06F 16/00* (2019.01)
*G06F 11/14* (2006.01)

(52) U.S. Cl.
CPC ...... *G06F 11/1461* (2013.01); *G06F 11/1451* (2013.01); *G06F 11/1464* (2013.01)

(58) Field of Classification Search
CPC ............. G06F 11/1461; G06F 11/1451; G06F 11/1464; G06F 11/1458; G06F 11/1448; H04L 41/22; H04L 67/42
See application file for complete search history.

(56) References Cited

U.S. PATENT DOCUMENTS

2018/0011643 A1* 1/2018 Calder ................ G06F 11/1458
2019/0340082 A1* 11/2019 Pradhan .............. G06F 11/1464

\* cited by examiner

*Primary Examiner* — Neveen Abel Jalil
*Assistant Examiner* — Paul Kim
(74) *Attorney, Agent, or Firm* — Chamberlain, Hrdlicka, White, Williams & Aughtry (57) ABSTRACT

Embodiments of the present disclosure provide methods, electronic device and computer program products for managing and performing data backup jobs. The method of managing a data backup job includes receiving, from a first client, a backup request for a backup job. The backup request at least indicates a first set of parameters for performing the backup job and initial parameter values corresponding to the first set of parameters. The method further includes determining updated parameter values of the first set of parameters based on a second set of parameters associated with the backup job which are pre-stored at a backup console, the first set of parameters and the initial parameter values. The method further includes transmitting the updated parameter values to the first client to cause the first client to perform the backup job based on the updated parameter values.

15 Claims, 7 Drawing Sheets

METHODS, ELECTRONIC DEVICES AND COMPUTER PROGRAM PRODUCTS FOR MANAGING AND PERFORMING DATA BACKUP JOBS

FIELD

Embodiments of the present disclosure generally relate to the field of data storage, and more specifically, to methods, electronic devices and computer program products for managing and performing data backup jobs.

BACKGROUND

When a data backup system is used, a user generally needs to trigger, manage and monitor backup jobs. For example, the user may wish to configure parameters for the backup job, such as the timeout value and network usage limit, and also may wish to cancel a backup job that is currently running. These examples are typical user scenarios for the management of backup jobs.

For various data backup systems, there are typically two ways of triggering and managing backup jobs. In one approach, the backup jobs may be triggered and managed with a command line interface of a backup client. In a data backup system employing this approach, the user needs to trigger and manage the backup jobs separately for different backup clients. In the other approach, the backup jobs may be triggered and managed from a client including, for example, a graphical user interface (GUI). In this way, the user may manage the backup jobs on a plurality of backup clients in a centralized way.

SUMMARY

Embodiments of the present disclosure provide a solution for managing and performing data backup jobs.

One aspect of the present disclosure provides a method of managing data backup jobs. The method comprises receiving, from a first client, a backup request for a backup job, the backup request at least indicating a first set of parameters for performing the backup job and initial parameter values corresponding to the first set of parameters. The method further comprises determining updated parameter values of the first set of parameters, based on a second set of parameters associated with the backup job which are pre-stored at a backup console, the first set of parameters and the initial parameter values for the first set of parameters. The method further comprises transmitting the updated parameter values to the first client to cause the first client to perform the backup job based on the updated parameter values.

One aspect of the present disclosure provides a method of performing data backup jobs. The method comprises transmitting to a backup console a backup request for a backup job, the backup request including a first set of parameters for performing the backup job and initial parameter values corresponding to the first set of parameters. The method further comprises receiving, from the backup console, updated parameter values of the first set of parameters, the updated parameter values being determined by the backup console based on a second set of parameters associated with the backup job, the first set of parameters and the initial parameter values for the first set of parameters. The method further comprises performing the backup job based on the updated parameter values.

One aspect of the present disclosure provides an electronic device comprising a processor and a memory coupled with the processor. The memory has instructions stored therein which, when executed by the processor, cause the device to perform a method, the method comprising receiving, from a first client, a backup request for a backup job, the backup request at least indicating a first set of parameters for performing the backup job and initial parameter values corresponding to the first set of parameters. The method further comprises determining updated parameter values of the first set of parameters, based on a second set of parameters associated with the backup job which are pre-stored at a backup console, the first set of parameters and the initial parameter values for the first set of parameters. The method further comprises transmitting the updated parameter values to the first client to cause the first client to perform the backup job based on the updated parameter values.

One aspect of the present disclosure provides an electronic device comprising a processor and a memory coupled with the processor. The memory has instructions stored therein which, when executed by the processor, cause the device to perform a method, the method comprising transmitting to a backup console a backup request for the backup job, the backup request including a first set of parameters for performing the backup job and initial parameter values corresponding to the first set of parameters. The method further comprises receiving, from the backup console, updated parameter values of the first set of parameters, the updated parameter values being determined by the backup console based on a second set of parameters associated with the backup job, the first set of parameters and the initial parameter values. The method further comprises performing the backup job based on the updated parameter values.

One aspect of the present disclosure, there is provided a computer program product being tangibly stored on a computer-readable medium and comprising machine executable instructions which, when executed, cause a machine to perform the method according to the any of the aforementioned aspects of the present disclosure.

The Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the exemplary embodiments of present disclosure, the same reference symbols usually represent the same components. In the drawings.

DETAILED DESCRIPTION OF EMBODIMENTS

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one further embodiment." The terms "first", "second" and so on can refer to same or different objects. Other definitions, either explicit or implicit, may be included below.

As mentioned above, for various data backup systems, there are two ways of triggering and managing backup jobs. For ease of discussion, the above approach utilizing a command line interface is referred to as a distributed manner; and the approach utilizing a client including a graphical user interface is referred to as a centralized manner. These two conventional approaches are described below with reference to FIGS. 1A and 1B.

Figure 1A:
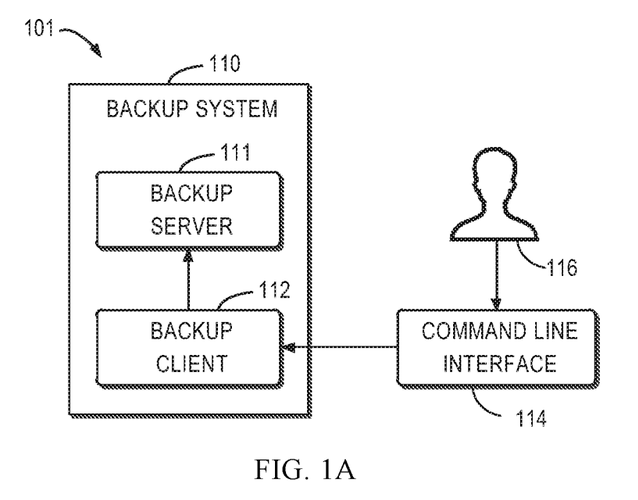
FIG. 1A is a schematic diagram illustrating an environment in which a conventional distributed approach may be implemented.

FIG. 1A is a schematic diagram illustrating an environment 101 in which a conventional distributed approach may be implemented. As shown in FIG. 1A, a backup system 110 includes a backup server 111 and a backup client 112, which is configured to perform a backup job to back up data to the backup server 111. The backup client 112 receives a backup request entered by a user 116 through a command line interface 114. After the backup request is received, the backup client 112 directly initiates the backup job to back up data to the backup server 111. In the environment 101, parameters for performing the backup job (such as, the timeout value and network resource usage limit) are also received via the command line interface 114. The backup client 112 may further store the received parameters.

Although FIG. 1A only illustrates one backup client 112, the backup system 110 may include multiple backup clients 112. In the case where a plurality of backup clients 112 are included, because the command line interface 114 is independent for each client, the user 116 needs connect to each command line interface and change configuration parameters one by one. Therefore, this approach is not convenient for a backup system 110 that has a plurality of backup clients 112.

Figure 1B:
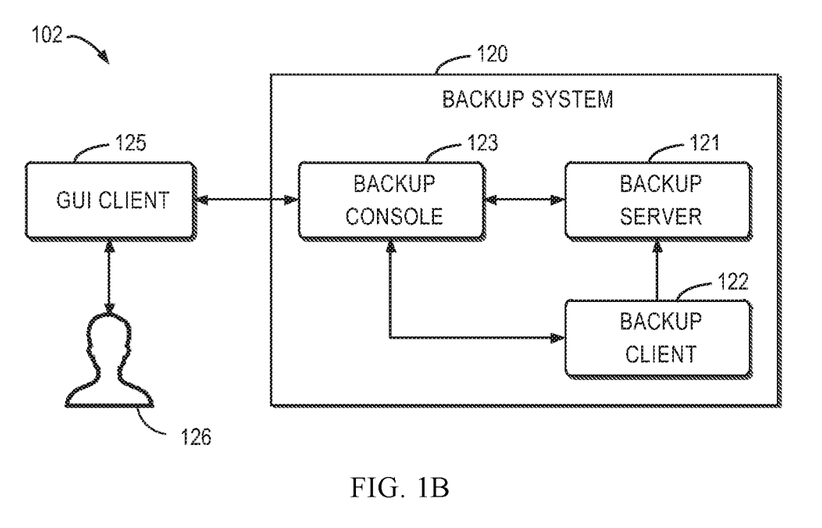
FIG. 1B is a schematic diagram illustrating an environment in which a conventional centralized approach may be implemented.

FIG. 1B is a schematic diagram illustrating an environment 102 in which a conventional centralized approach may be implemented. As shown in FIG. 1B, the backup system 120 includes a backup server 121, a backup client 122 and a backup console 123 (such as Management Console Server). The backup console 123 may trigger and manage backup jobs in a centralized way. The user 126 may access the backup console 123 through a client deployed in a particular platform (such as Windows platform), such as a graphical user interface (GUI) client 125. Therefore, the user 126 may trigger and manage the backup job of the client 122 using GUI.

After receiving a request from the user 126 via the GUI client 125, the backup console 123 transmits a backup request to the backup client 122 to cause the backup client 122 to perform the related backup job. During the execution of the backup job, the backup client 122 may transmit to the backup console 123 information related to the execution of the backup job (such as, data backup progress, etc.).

Similar to the description above with respect to FIG. 1A, the backup system 120 may also include a plurality of backup clients 122. The backup console 123 is a centralized control device which can trigger and manage the backup jobs for all the backup clients 122. If the user 126 wishes to configure the backup jobs, for example, to change the network resource usage of the backup client 122, the user 126 may login the GUI client 125 and select the backup client 122 to be configured. Therefore, in the environment 102, the user 126 can trigger and manage the backup jobs for a plurality of backup clients 122 at the same time and can graphically monitor the execution of the backup job.

It can be seen that in the approach described with reference to FIG. 1A, the backup jobs are managed in a distributed way, and in the approach described with reference to FIG. 1B, the backup jobs are managed a centralized way. For a backup system that has employed distributed management (such as the backup system 110 shown in FIG. 1A), in order to enable it to manage backup jobs in a centralized way, in the conventional solution, it is necessary to add a backup console (such as the backup console 123) in the backup system and migrate to the backup console configuration parameters from the command line interface which are stored in the backup client.

However, there are various problems related to implementing the migration of the backup parameters. Particularly when there exist numerous backup clients, it is hard to accurately migrate all the configuration parameters in the backup client to the backup console. For example, during the parameter migration, it is difficult to find all the configuration parameters of all the backup clients accurately without omitting any configuration parameters. Once some configuration parameters are left out during the parameter migration, the modified backup system will not be able to operate as anticipated, thereby affecting the efficiency of the backup job.

The present disclosure provides a solution for managing and performing data backup jobs to solve the above and other potential defects and problems. In this disclosure, after receiving a backup request from, for example, a command line interface, the backup client first transmits the backup request to the backup console instead of initiating the backup job directly. The backup console determines, based on the received backup request and parameters stored locally, updated parameter values for performing the backup job and sends the updated parameter values back to the backup client. The parameters stored in the backup console may be configured by the user through, for example, a graphical user interface. The backup client performs the backup job based on the received updated parameter values. In this manner, the backup jobs originally managed in a distributed way may be managed a centralized way without migrating the initial configuration parameters from the backup client to the backup console so as to improve the efficiency of managing and performing backup jobs.

Figure 2:
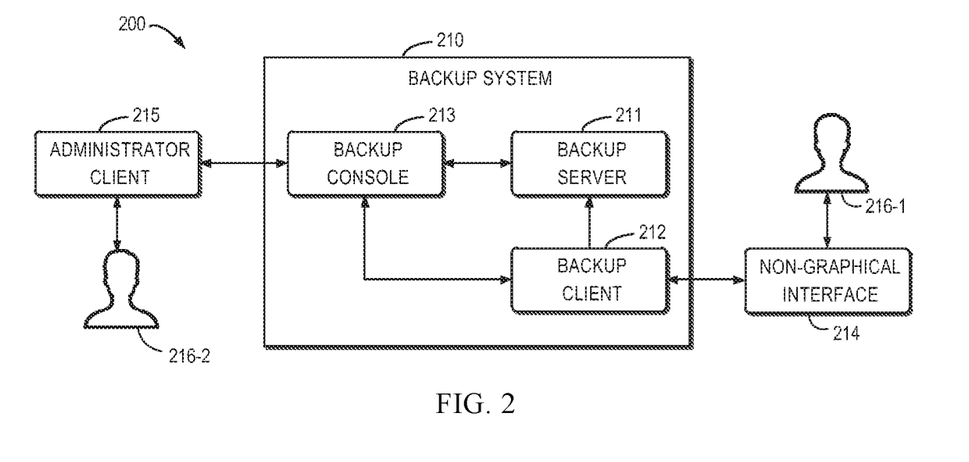
FIG. 2 is a schematic diagram illustrating an example environment in which embodiments of the present disclosure may be implemented.

Embodiments of the present disclosure will be described below in detail with reference to FIGS. 2-8. FIG. 2 is a schematic diagram illustrating an example environment 200 in which embodiments of the present disclosure may be implemented. As shown in FIG. 2, the environment 200 may generally include an administrator client 215, a backup system 210 and a non-graphical interface 214. It is to be understood that the structure and function of the example environment 200 are described only for purpose of illustration rather than suggesting any limitation to the scope of the present disclosure. Embodiments of the present disclosure may also be applied to an environment with different structures and/or functions.

The backup system 210 may include a backup server 211, a backup client 212 and a backup console 213. The backup server 211 may be similar to the backup server 111 described with reference to FIG. 1A and the backup server 121 described with reference to FIG. 1B. The backup console 213 may be similar to the backup console 123 described with reference to FIG. 1B, but it may further implement the interactions and processes according to embodiments of the present disclosure.

The backup client 212 may be similar to the backup client 112 described with reference to FIG. 1A and the backup client 122 described with reference to FIG. 1B, but it may further implement the interaction and process according to embodiments of the present disclosure. For example, the backup client 212 may include modules configured to implement the interactions and processes according to embodiments of the present disclosure. It is to be understood that this is only illustrative and the backup client 212 may implement the interactions and processed according to embodiments of the present disclosure in any appropriate manner. Moreover, it is to be understood that although only one backup client 212 is shown, the backup system 210 may include multiple backup clients 212.

The non-graphical interface 214 refers to an interface for interacting with the user and not including a graphical user interface. With such an interface, the user needs to send a command to the backup client 212 by means of, for example, entering text. In some embodiments, the non-graphical interface 214 may be the command line interface 114 described with reference to FIG. 1A. The user 216-1 may initiate a backup job to the backup client 212 via the non-graphical interface 214.

The administrator client 215 is a client that can provide centralized management for the backup jobs. In some embodiments, the administrator client 215 may be similar to the GUI client 125 described with reference to FIG. 1B. The user 216-2 may enter the parameters for performing the backup job to the backup console 213 via the administrator client 215. Moreover, during the execution of the backup job, the user 216-2 may monitor the performance of the backup job in the backup client 212 through the administrator client 215.

In some embodiments, the user 216-1 and user 216-2 may be the same user, for example, the administrator of the backup system 210. In some embodiments, the user 216-1 and user 216-2 may be different users, for example, the user 216-1 may be a user of a device in which the backup client 212 is deployed and the user 216-2 may be an administrator of the backup system 210.

In the following depiction, the backup client 212 is also referred to as a first client and the administrator client 215 is referred to as a second client. Therefore, in the present disclosure, the terms "backup client" and "first client" may be used interchangeably; and the terms "administrator client" and "second client" may be used interchangeably. It is to be understood that the administrator client and the second client are intended to include clients that may provide the user with centralized management of backup jobs in any manner currently known or to be developed in the future, including but not limited to, through a graphical user interface.

Figure 3:
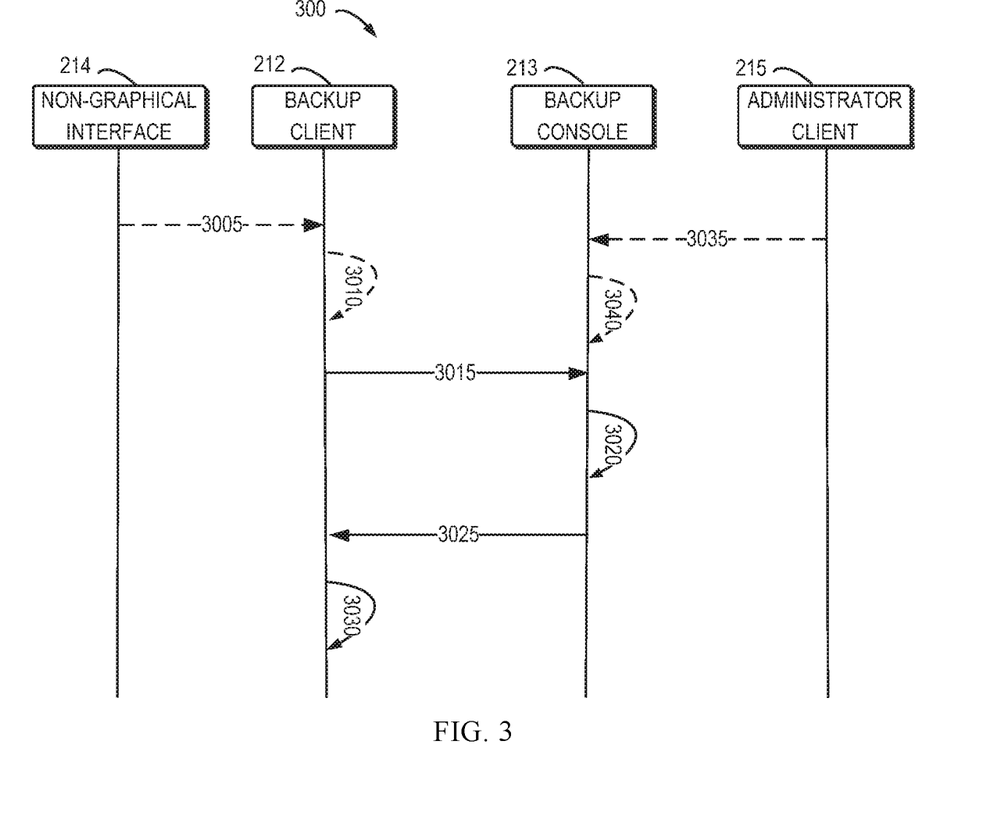
FIG. 3 is a schematic diagram illustrating an interaction in accordance with embodiments of the present disclosure.

FIG. 3 is a schematic diagram illustrating interaction 300 in accordance with embodiments of the present disclosure. The backup client 212 transmits 3015 to the backup console 213 a backup request for a backup job. In some embodiments, the backup client 212 may transmit 3015 the backup request periodically. Alternatively or additionally, the backup client 212 may transmit 3015 the backup request regularly based on a predefined rule. In some embodiments, the non-graphical interface 214 may transmit 3005 to the backup client 212 a backup command from user 216-1 for initiating a backup job, and the backup client 212 may parse 3010 the received backup command to generate the backup request to be transmitted to the backup console 213.

The backup request transmitted 3015 by the backup client 212 at least indicates a first set of parameters for performing a backup job and initial parameter values corresponding to the first set of parameters. Moreover, the backup request may further include other information, such as information about data to be backed up. The first set of parameters, for example, may include the timeout value, network usage limit and so on. The first set of parameters may be parameters stored locally at the backup client 212, for example, parameters used when the previous backup jobs are performed. Alternatively or additionally, the first set of parameters may be transmitted 3005 via the non-graphical interface 214 along with the backup command.

After receiving the backup request transmitted 3015 by the backup client 212, the backup console 213 may determine 3020 updated parameter values of the first set of parameters, based on its pre-stored second set of parameters related to the backup job and the received first set of parameters and the initial parameter values for the first set of parameter. In some embodiments, the second set of parameters may be default parameters for performing the backup job, which are pre-stored by the backup console 213. In some embodiments, the second set of parameters may be generated 3040 by the backup console 213 based on the parameters transmitted 3035 by the administrator client 215. The process of generating 3040 or updating the second set of parameters will be described further in detail below.

In some embodiments, the backup console 213 may determine 3020 the updated parameter values based on the time when the first and second sets of parameters are obtained. For example, for a parameter that is included in both the first and second sets of parameters, a parameter value corresponding to the parameter obtained later may be configured as the updated parameter value of the parameter. By way of example, the first set of parameters include the parameter "timeout value" whose initial parameter value is 10 hours, and this parameter value was obtained five days ago; the second set of parameters also include the parameter "timeout value" whose corresponding parameter value is 20 hours, and the parameter value in the second set of parameters was obtained 2 days ago. In this case, the backup console 213 may determine "20 hours" as the updated parameter value of the parameter "timeout value". It is to be understood that the first set of parameters may include any parameter for performing the backup job. The above example is not intended to limit the scope of the present disclosure.

In some embodiments, the backup console 213 may determine 3020 the updated parameter values based on a predefined priority. The process of determining 3020 the updated parameter values based on a priority will be described below in detail.

The backup console 213 transmits 3025 the determined updated parameter values to the backup client 212. The backup client 212 performs 3030 the backup job based on the received updated parameter values. For example, the backup client 212 may transmit to the backup server 211 the data to be backed up.

In this manner, the user may initiate a backup job from a non-graphical interface such as the command line interface, while modifying configuration parameters for performing the backup job with a centralized administrator client. This approach may eliminate the potential problems of parameters loss caused by migrating parameters.

An example in which the backup console 213 determines 3020 the updated parameter values based on the second set of parameters, the first set of parameters and the initial parameter values will be described below. Different from the conventional approach described with reference to FIGS. 1A and 1B, in embodiments of the present disclosure, it is possible to use parameters stored in the backup client 212 or parameters configured by the user 216-2 via the administrator client 215.

As indicated above, the second set of parameters pre-stored in the backup console 213 may originate from a user input indicating a parameter, for example, a parameter entered by the user 216-2 via the administrator client 215. Still taking the above parameter "timeout value" as an example, in the first set of parameters transmitted by the backup client 212, the value corresponding to the parameter "timeout value" might be 10 hours, while the value corresponding to the parameter "timeout value" in the second set of parameters may be 20 hours. In this case, two different parameter values conflict with each other. In this regard, in some embodiments, priorities of the parameter values corresponding to the second set of parameters may be configured to be higher than those of the initial parameter values corresponding to the first set of parameters.

Specifically, for a certain parameter (for ease of discussion, hereinafter referred to as first parameter) in the first set of parameters, the backup console 213 may determine whether the second set of parameters includes the first parameter. If the backup console 213 determines that the second set of parameters includes the first parameter, the backup console 213 may set the parameter value stored therein for the first parameter as the updated parameter value for the first parameter. For example, for the above example of the parameter "timeout value", the backup console 213 may set "20 hours" as the updated parameter value for the parameter "timeout value".

For another parameter (for ease of discussion, hereinafter referred to as second parameter) in the first set of parameters, the backup console 213 may determine whether the second set of parameters includes the second parameter. If the backup console 213 determines that the second set of parameters do not include the second parameter, it may send back to the backup client 212 the initial parameter value of the second parameter as the updated parameter value and store the second parameter as a part of the second set of parameters. For example, the second parameter may be a number of threads occupied by the backup job and its initial parameter value is 4. If it is determined that the second set of parameters does not include the parameter "number of threads", the backup console 213 may transmit to the backup client 212 the initial parameter value "4" as the updated value and store the parameter "number of threads" and its parameter value "4."

In such embodiments, without performing migration of configuration parameters, the user can still use the initial parameters stored in the backup client 212, for example, parameters used in the previous backup jobs, or parameters received via the command line interface. In this way, the problem of parameter loss that might be caused by parameter migration can be avoided.

It is to be noted that in some cases, it is possible that none of the parameters in the first set of parameters is included in the second set of parameters, for example, when the backup console 213 does not receive parameters from the administrator client 215. In this case, the backup console 213 may choose not to send back to the backup client 212 the initial parameter values and the backup client 212 may perform the backup job directly based on the first set of parameters stored therein when no updated parameter value has been received after a predetermined time interval.

As indicated above, in some embodiments, the backup console 213 may generate 3040 or update the second set of parameters. In particular, the user 216-2 (such as the administrator of the backup system) may wish to modify a certain parameter (for ease of discussion, hereinafter referred to as third parameter). The administrator client 215 may transmit 3035 to the backup console 213 the third parameter entered by the user 216-2. After the third parameter is received, the backup console 213 may determine whether the second set of parameters includes the third parameter. If the second set of parameters does not include the third parameter, then the backup console 213 may store the received third parameter and its parameter value as a part of the second set of parameters.

The user 216-2 may wish to modify another parameter (for ease of discussion, hereinafter referred to as fourth parameter). After receiving the fourth parameter transmitted 3035 by the administrator client 215, the backup console 213 may determine whether the second set of parameters includes the fourth parameter. If the second set of parameters already includes the fourth parameter, then the backup console 213 may store the received fourth parameter value for the fourth parameter. In other words, in this case, the backup console 213 will replace (such as overwrite) the previously stored parameter value for the fourth parameter with the received fourth parameter value. Taking the above parameter "timeout value" as an example, the parameter value stored in the second set of parameters is 20 hours. If the parameter value for the parameter "timeout value" received by the backup console 213 from the administrator client 215 is 15 hours, then the backup console 213 will store 15 hours as the parameter value for the parameter "timeout value".

In such embodiments, while being able to use the initial parameter stored in the backup client 212, the user may also modify some parameters through a user-friendly administrator client as needed. Particularly when the parameters of a plurality of backup clients need to be modified, the user only needs to select the backup clients to be modified and parameters thereof through the administrator client without having to configure them one by one through the non-graphical interface. In this way, the user can modify configuration parameters for performing the backup job conveniently and timely, thereby improving the efficiency of the backup job.

In some embodiments, the backup console 213 may also store a third set of parameters. For example, the third set of parameters may include default parameters for performing the backup job. The third set of parameters may be configured by the developer of the backup system or by the administrator of the backup system when the backup system is initiated. The third set of parameters may be a default configuration for performing all the backup jobs. In this case, the third set of parameters may have a lower priority than the first and second sets of parameters. In other words, for a certain parameter (for ease of discussion, hereinafter referred to as fifth parameter) in the third set of parameters, if neither the first set of parameters nor the second set of parameters includes the fifth parameter, then the backup console 213 may transmit to the backup client 212 a fifth parameter as an additional parameter, so that the backup client 212 may perform the backup job based on the fifth parameter.

It is to be noted that the first, second, third, fourth and fifth parameters mentioned above may refer to any parameter for performing the backup job and the above example parameters "timeout value" and "number of threads" and their parameter values are not intended to limit the scope of the present disclosure.

Figure 4:
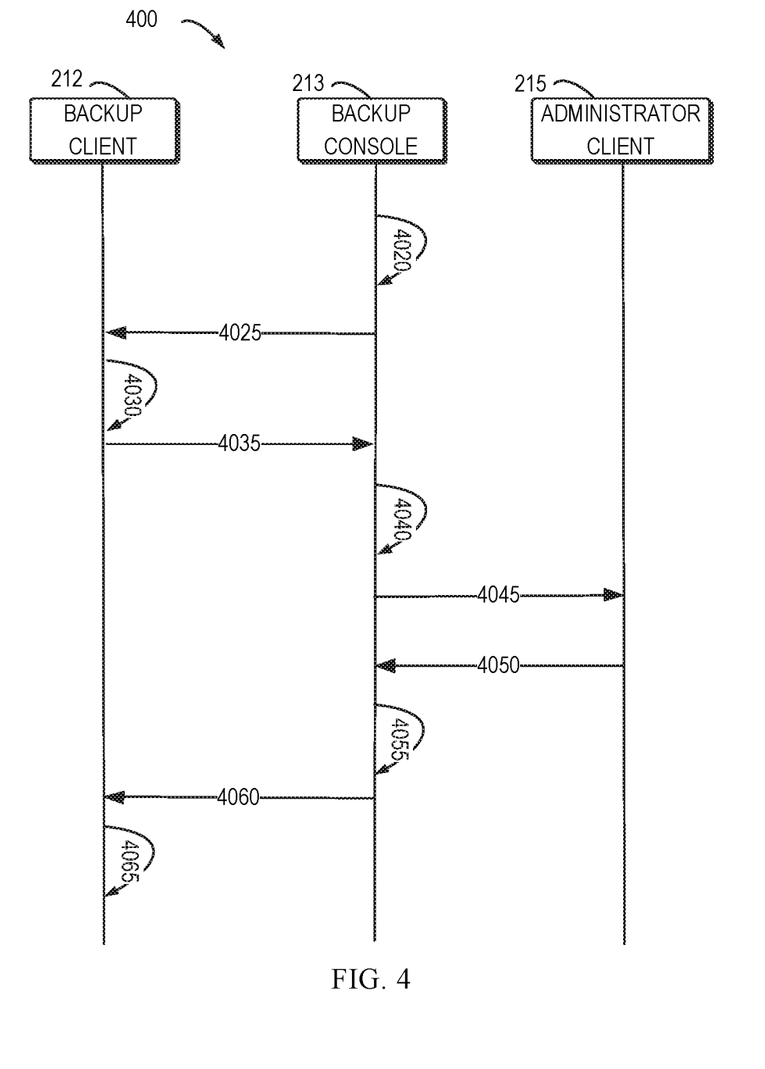
FIG. 4 is a schematic diagram illustrating an interaction in accordance with some embodiments of the present disclosure.

Interaction 300 for determining the parameters for performing the backup job has been described above with reference to FIG. 3. As mentioned above, the administrator client 215 may manage the backup job in a user-friendly way. Therefore, in some embodiments, in order to facilitate managing the backup job, a backup job identifier may be generated by the backup console 213. Reference will be made to FIG. 4 below to describe how to manage the backup job based on the backup job identifier. FIG. 4 is a schematic diagram illustrating interaction 400 according to some embodiments of the present disclosure.

As described with reference to FIG. 3, the backup client 212 transmits 3015 to the backup console 213 a backup request for the backup job. Referring to FIG. 4, in response to receiving the backup request, the backup console 213 may further generate 4020 a backup job identifier associated with the backup job and locally store the generated backup job identifier to manage the backup job. The backup console 213 may transmit 4025 the generated backup job identifier to the backup client 212. The backup client 212 stores 4030 the received backup job identifier, so as to communicate information related to execution of the backup job to the backup console 213 in the subsequent operation by means of the backup job identifier.

It is to be understood that the scope of the present disclosure is not limited to the order of the above step of generating 4020 the backup job identifier and the step of determining 3020 the updated parameter values as described above with reference to FIG. 3. The two steps may be performed in parallel or serially. Moreover, the step of transmitting 4025 the backup job identifier and the step of transmitting 3025 the updated parameter values as described above with reference to FIG. 3 may be performed in parallel or serially. The scope of the present disclosure is not limited in this regard.

As stated above, in some embodiments, during the execution of the backup job, the backup client 212 may communicate information related to the execution of the backup job to the backup console 213 with the stored backup job identifier. For example, if an error occurs in the backup job, the backup client 212 may transmit 4035 to the backup console 213 information containing the backup job identifier about the error. The backup console 213 determines 4040 a context of the backup job using the backup job identifier and then transmits 4050 information about the error to the administrator client 215 so that the user can conveniently view information about errors associated with the backup job through the administrator client 215. It is to be noted that the above example is only for the purpose of illustrating embodiments of the present disclosure and the backup client 212 may communicate any information associated with the execution of the backup job through the above interaction.

In some embodiments, the backup console 213 may also manage the backup job based on the backup job identifier. As an example, if a certain backup job is to be cancelled, the administrator client 215, after receiving a cancellation command from the user, may transmit 4050 a cancellation request to the backup console 213. The backup console 213 determines 4055 the backup job identifier associated with the backup job to be cancelled and then transmits 4060 to the backup client 212 the cancellation request containing the backup job identifier. The backup client 212 will cancel 4065 the backup job corresponding to the received backup job identifier. It is to be noted that the above example is only for the purpose of illustrating embodiments of the present disclosure and the backup console 213 may perform various management for the backup job based on the backup job identifier.

In such embodiments, the user otherwise using a non-graphical interface may conveniently manage and monitor the execution of the backup job through the administrator client. In this way, all the backup jobs may be managed and monitored in a centralized way, thereby improving the user experience of the backup system.

In some embodiments, the backup job identifier may be further added to a log file for the backup job to facilitate trouble shooting. The backup console 213 and the backup client 212 typically have their respective log files, which need to be checked sometimes from both the backup console 213 and the backup client 212. However, the log files in the backup console 213 and the backup client 212 may have different file names. Therefore, the backup job identifier may be used to establish a mapping relationship between the log files. In particular, the log files in the backup console 213 and the backup client 212 having the same backup job identifier may be determined as the respective log files of the same backup job. In such embodiments, trouble-shooting can be achieved effectively by the combination of log files in the backup console 213 and the backup client 212.

Figure 5:
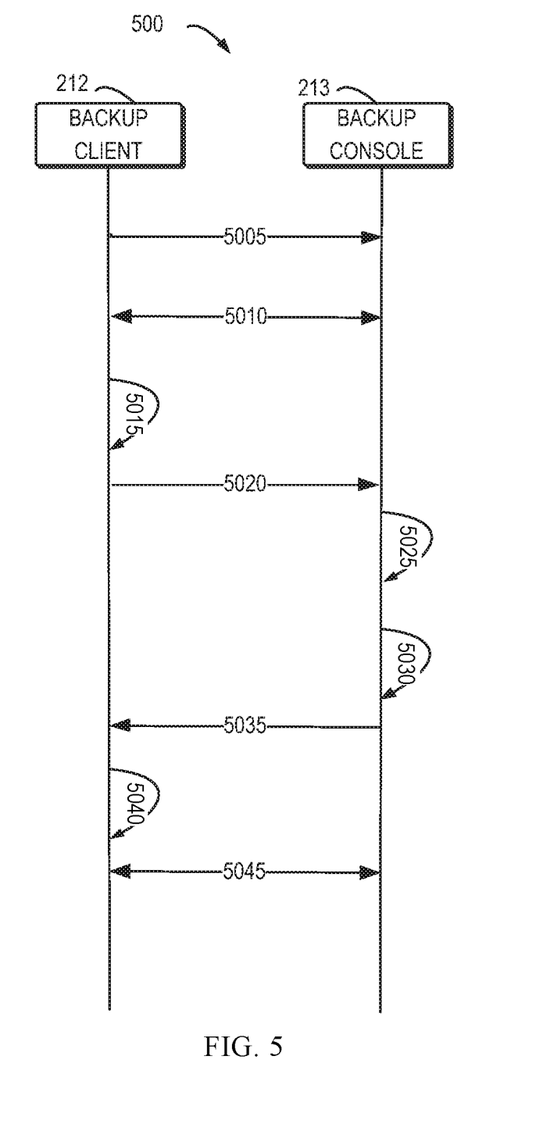
FIG. 5 is a schematic diagram illustrating an interaction in accordance with some embodiments of the present disclosure.

In some embodiments, in order to securely perform the interactions 300 and 400 described above with reference to FIGS. 3 and 4, a secure connection between the backup client 212 and the backup console 213 may be established before transmitting a backup request to the backup console 213. Reference will be made to FIG. 5 below to describe an interaction 500 for establishing a secure connection.

FIG. 5 is a schematic diagram illustrating an interaction 500 in accordance with some embodiments of the present disclosure. The backup client 212 initiates 5005 a request to the backup console 213. In response to the request, for example, a secure socket layer (SSL) connection is first established 5010 between the backup client 212 and the backup console 213. The backup client 212 obtains 5015 its own client information (such as a client identifier) and then transmits 5020 to the backup console 213 a verification request containing the client information. The backup console 213 verifies 5025 the client information. If a verification result indicates that the backup client 212 has already been registered, the backup client 212 may be considered being successfully verified. In response to the backup client 212 being successfully verified, the backup console 213 may obtain 5030 its own console identifier and then transmit 5035 to the backup client 212 a positive response containing the console identifier. The backup client 212 verifies 5040 the received console identifier. If the verification result indicates that the backup console 213 has already been registered, then a secure connection between the backup client 212 and the backup console 213 is established 5045. The interaction between the backup client 212 and the backup console 213 described above with reference to FIGS. 3 and 4 may be implemented through the secure connection.

In such embodiments, the mutual verification between the backup client 212 and the backup console 213 ensures that a secure connection is established only between the registered backup client and backup console. In this way, attacks from other virtual backup clients and backup consoles may be prevented so as to make the connection more secure.

Figure 6:
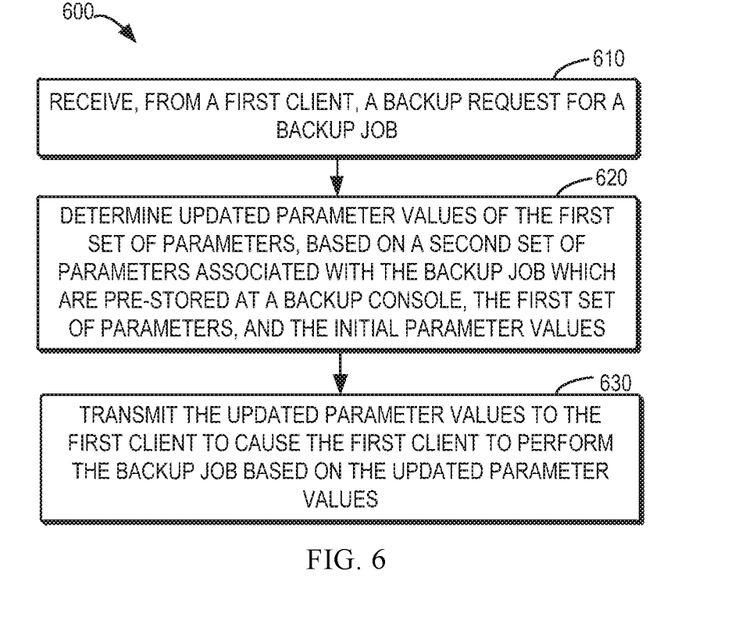
FIG. 6 is a flowchart illustrating a process for managing data backup jobs in accordance with some embodiments of the present disclosure.

FIG. 6 is a flowchart illustrating a process 600 for managing a data backup job in accordance with some embodiments of the present disclosure. The process 600 shown in FIG. 6 may be implemented at the backup console 213 shown in FIG. 2. The first client and the second client described below with reference to FIG. 6 below may be the backup client 212 and the administrator client 215 shown in FIG. 2, respectively.

At 610, the backup console 213 receives from the first client a backup request for the backup job. The backup request at least indicates a first set of parameters for performing the backup job and initial parameter values corresponding to the parameters. For example, the first set of parameters may include parameters "timeout value", "network resource limit" and so on. Moreover, the backup request may further include information related to data to be backed up.

At 620, the updated parameter values of the first set of parameters may be determined based on the second set of parameters associated with the backup job which are pre-stored at the backup console 213, the first set of parameters and the initial parameter values. In some embodiments, the updated parameter values may be determined based on the time when the parameter values are obtained. In some embodiments, the updated parameter values may be determined based on a predetermined priority.

In some embodiments, for a first parameter in the first set of parameters, the backup console 213 may determine whether the second set of parameters includes the first parameter. If the second set of parameters includes the first parameter, then the backup console 213 may configure the parameter value of the first parameter pre-stored therein as the updated parameter value for the first parameter.

In some embodiments, for a second parameter in the first set of parameters, the backup console 213 may determine whether the second set of parameters includes the second parameter. If the second set of parameters does not include the second parameter, then the backup console 213 may send back to the first client the initial parameter value of the second parameter as the updated parameter value and may further store the second parameter as a part of the second set of parameters.

At 630, the backup console 213 transmits the updated parameter value to the first client to cause the first client to perform the backup job based on the updated parameter value.

In some embodiments, the backup console 213 may receive a third parameter for performing the backup job from a second client different from the first client. If the second set of parameters does not include the third parameter, then the backup console 213 may store the third parameter as a part of the second set of parameters.

In some embodiments, the backup console 213 may receive, from a second client different from the first client, a fourth parameter for performing the backup job and a fourth parameter value of the fourth parameter. If the second set of parameters includes the fourth parameter, then the backup console 213 may locally store the received fourth parameter value.

In some embodiments, the above second client may include a graphical user interface which is adapted to receive a user input indicating a parameter. For example, the second client may be similar to the GUI client 125 as described with reference to FIG. 1B.

In some embodiments, in response to receiving the backup request from the first client, the backup console 213 may further generate a backup job identifier associated with the backup job for managing the backup job. The backup console 213 may transmit the generated backup job identifier to the first client.

In some embodiments, in response to receiving a verification request from the first client, the backup console 213 may verify the first client. If the first client is successfully verified, the backup console 213 may establish a secure connection with the first client to receive the above backup request.

Figure 7:
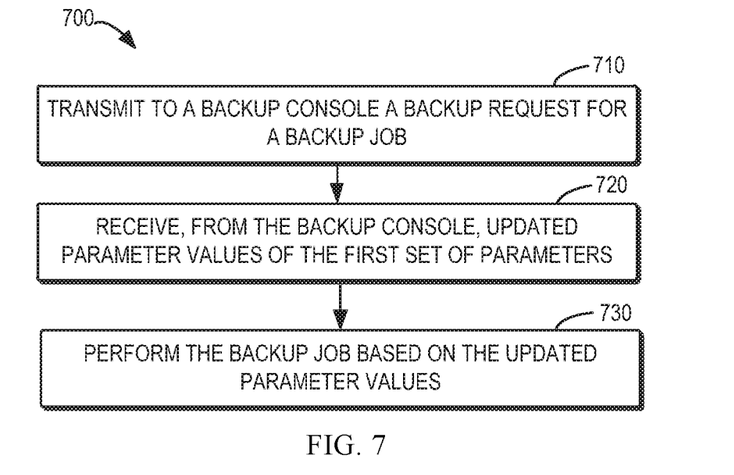
FIG. 7 is a flowchart illustrating a process for performing data backup jobs in accordance with some embodiments of the present disclosure.

FIG. 7 is a flowchart illustrating a process 700 for performing a data backup job in accordance with some embodiments of the present disclosure. The process 700 shown in FIG. 7 may be implemented in the backup client 212 shown in FIG. 2. The backup console described below with reference to FIG. 7 may be the backup console 213 shown in FIG. 2.

At 710, the backup client 212 may transmit to the backup console 213 a backup request for a backup job. The backup request includes a first set of parameters for performing the backup job and initial parameter values corresponding to the parameters. Alternatively or additionally, the backup request may further include information related data to be backed up.

At 720, the backup client 212 may receive, from the backup console 213, updated parameter values of the first set of parameters. The updated parameter values may be determined by the backup console 213 based on a second set of parameters related to the backup job, the first set of parameters and the initial parameter values. For example, the updated parameter values may be determined as described above with reference to FIGS. 3 and 6.

In some embodiments, the second set of parameters may be generated by the backup console 213 based on the input received from a client including a user graphical interface, and the backup request is received from a non-graphical user interface. For example, the client including the graphical user interface may be similar to the GUI client 215 described above with reference to FIG. 1B. The non-graphical interface may be similar to the command line interface 114 described above with reference to FIG. 1A.

At 730, the backup client 212 may perform the backup job based on the updated parameter values. For example, the backup client 212 may transmit data to be backed up to the backup server 211 based on the updated parameter values.

In some embodiments, the backup client 212 may receive a backup job identifier generated by the backup console 213 and associated with the backup job. During the execution of the backup job, the backup client 212 may use the backup job identifier to communicate to the backup console 213 information related to the execution of the backup job. For example, the backup client 212 may communicate to the backup console 213 errors occurring during the execution of the backup job.

In some embodiments, the backup client 212 may transmit a verification request to the backup console 213. If a positive response to the verification request is received from the backup console 213, for example, if the console identifier transmitted by the backup console 213 is received, then a secure connection with the backup console 213 may be established to transmit the backup request to the backup console 213. Moreover, information related to the execution of the backup job may be communicated to the backup console 213 through the secure connection.

Figure 8:
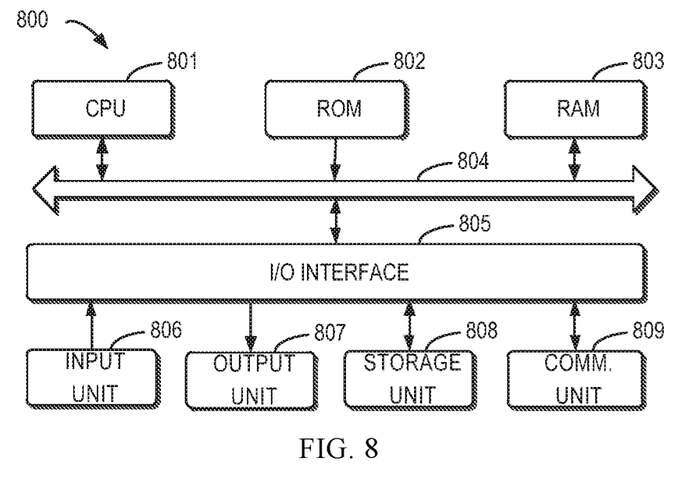
FIG. 8 is a block diagram illustrating an example device that may be used to implement embodiments of the present disclosure.

FIG. 8 is a schematic block diagram illustrating an example device 800 that may be used to implement embodiments of the present disclosure. As illustrated in FIG. 8, the device 800 comprises a central processing unit (CPU) 801 which can execute various appropriate actions and processing based on the computer program instructions stored in a read-only memory (ROM) 802 or the computer program instructions loaded into a random access memory (RAM) 803 from a storage unit 808. The RAM 803 also stores all kinds of programs and data required by operating the storage device 800. CPU 801, ROM 802 and RAM 803 are connected to each other via a bus 804 to which an input/output (I/O) interface 805 is also connected.

A plurality of components in the device 800 are connected to the I/O interface 805, comprising: an input unit 806, such as keyboard, mouse and the like; an output unit 807, such as various types of displays, loudspeakers and the like; a storage unit 808, such as magnetic disk, optical disk and the like; and a communication unit 809, such as network card, modem, wireless communication transceiver and the like. The communication unit 809 allows the device 800 to exchange information/data with other devices through computer networks such as Internet and/or various telecommunication networks.

The processing unit 801 performs various methods and processes as described above, for example, process 600 and/or process 700. For example, in some embodiments, the process 600 and/or process 700 may be implemented as a computer software program or computer program product, which is tangibly included in a machine-readable medium, such as the storage unit 808. In some embodiments, the computer program can be partially or fully loaded and/or installed to the device 800 via ROM 802 and/or the communication unit 809. When the computer program is loaded to RAM 803 and executed by CPU 801, one or more steps of any of the process 600 and/or process 700 described above are implemented. Alternatively, in other embodiments, CPU 801 may be configured to implement the process 600 and/or process 700 in any other suitable manner (for example, by means of a firmware).

According to some embodiments of the present disclosure, there is provided a computer readable medium storing computer programs thereon which, when executed by the processor, implement the method according to the present disclosure.

It is to be understood by those skilled in the art that various steps of the method of the disclosure above may be implemented via a general-purpose computing device, which may be integrated on a single computing device or distributed over a network composed of a plurality of computing devices. Optionally, they may be implemented using program code executable by the computing device such that they may be stored in a storage device and executed by the computing device; or they may be made into respective integrated circuit modules or a plurality of modules or steps therein may be fabricated into a single integrated circuit module for implementation. In this way, the present disclosure is not limited to any specific combination of hardware and software.

It is to be understood that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of managing a data backup job, comprising:
receiving, from a first client, a backup request for a backup job, the backup request at least indicating a first set of parameters for performing the backup job and initial parameter values for the first set of parameters;
determining updated parameter values of the first set of parameters, based on a second set of parameters associated with the backup job which are pre-stored at a backup console, the first set of parameters, and the initial parameter values for the first set of parameters, wherein determining the updated parameter values comprises:
for a second parameter of the first set of parameters, determining whether the second set of parameters includes the second parameter;
in response to the second set of parameters not including the second parameter, sending back to the first client the corresponding initial parameter value of the initial parameter values as the updated parameter value, and
storing the second parameter as a part of the second set of parameters; and
transmitting the updated parameter values to the first client,
wherein the first client performs the backup job based on the updated parameter values.

2. The method according to claim 1, wherein determining the updated parameter values comprises:
for a parameter of the first set of parameters, determining whether the second set of parameters includes the parameter; and
in response to the second set of parameters including the parameter, setting a parameter value of the parameter pre-stored at the backup console as the updated parameter value for the parameter.

3. The method according to claim 1, further comprising:
receiving, from a second client different from the first client, a parameter for performing the backup job; and
in response to the second set of parameters not including the parameter, storing the parameter as a part of the second set of parameters.

4. The method according to claim 1, further comprising:
receiving, from a second client different from the first client, a parameter for performing the backup job and a parameter value of the parameter; and
in response to the second set of parameters including the parameter, locally storing the received parameter value.

5. The method according to claim 4, wherein the second client comprises a graphical user interface adapted to receive a user input indicating the parameter.

6. The method according to claim 1, further comprising:
in response to receiving the backup request from the first client,
generating a backup job identifier associated with the backup job to manage the backup job; and
transmitting the backup job identifier to the first client.

7. The method according to claim 1, further comprising:
in response to receiving a verification request from the first client, verifying the first client; and
in response to the first client being successfully verified, establishing a secure connection with the first client to receive the backup request.

8. An electronic device, comprising:
a processor; and
a memory coupled with the processor, the memory having instructions stored therein which, when executed by the processor, cause the device to perform a method, the method comprising:
receiving, from a first client, a backup request for a backup job, the backup request at least indicating a first set of parameters for performing the backup job and initial parameter values for the first set of parameters;
determining updated parameter values of the first set of parameters, based on a second set of parameters associated with the backup job which are pre-stored at a backup console, the first set of parameters and the initial parameter values, wherein determining the updated parameter values comprises:
for a second parameter in the first set of parameters, determining whether the second set of parameters includes the second parameter;
in response to the second set of parameters not including the second parameter,
sending back to the first client the corresponding initial parameter value of the initial parameter values as the updated parameter value, and
storing the parameter as a part of the second set of parameters; and
transmitting the updated parameter values to the first client,
wherein the first client performs the backup job based on the updated parameter values.

9. The electronic device according to claim 8, wherein determining the updated parameter values comprises:
for a parameter of the first set of parameters, determining whether the second set of parameters includes the parameter; and
in response to the second set of parameters including the first parameter, setting a parameter value of the parameter pre-stored at the backup console as the updated parameter value for the parameter.

10. The electronic device according to claim 8, the method further comprising:
receiving, from a second client different from the first client, a parameter for performing the backup job; and
in response to the second set of parameters not including the parameter, storing the parameter as a part of the second set of parameters.

11. The electronic device according to claim 8, the method further comprising:
receiving, from a second client different from the first client, a parameter for performing the backup job and a parameter value of the parameter; and
in response to the second set of parameters including the parameter, locally storing the received parameter value.

12. The electronic device according to claim 11, wherein the second client comprises a graphical user interface adapted to receive a user input indicating the parameter.

13. The electronic device according to claim 8, the method further comprising:
in response to receiving the backup request from the first client,
generating a backup job identifier associated with the backup job to manage the backup job; and
transmitting the backup job identifier to the first client.

14. The electronic device according to claim 8, the method further comprising:
in response to receiving a verification request from the first client, verifying the first client; and
in response to the first client being successfully verified, establishing a secure connection with the first client to receive the backup request.

15. A computer program product being tangibly stored on a computer readable medium and comprising machine executable instructions which, when executed, cause a machine to perform the method, the method comprising:
receiving, from a first client, a backup request for a backup job, the backup request at least indicating a first set of parameters for performing the backup job and initial parameter values for the first set of parameters;
determining updated parameter values of the first set of parameters, based on a second set of parameters associated with the backup job which are pre-stored at a backup console, the first set of parameters, and the initial parameter values for the first set of parameters, wherein determining the updated parameter values comprises:
for a second parameter in the first set of parameters, determining whether the second set of parameters includes the second parameter;
in response to the second set of parameters not including the second parameter,
sending back to the first client the corresponding initial parameter value of the initial parameter values as the updated parameter value, and
storing the parameter as a part of the second set of parameters; and
transmitting the updated parameter values to the first client,
wherein the first client to performs the backup job based on the updated parameter values.

* * * * *